United States Patent
Abraham et al.

(10) Patent No.: US 8,638,258 B2
(45) Date of Patent: Jan. 28, 2014

(54) METHOD AND SYSTEM FOR A VIRTUAL WIDE AREA GNSS REFERENCE NETWORK

(75) Inventors: Charles Abraham, Los Gatos, CA (US); David Albert Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/613,285

(22) Filed: Sep. 13, 2012

(65) Prior Publication Data

US 2013/0009813 A1 Jan. 10, 2013

Related U.S. Application Data

(63) Continuation of application No. 13/313,149, filed on Dec. 7, 2011, now Pat. No. 8,339,314, which is a continuation of application No. 12/503,954, filed on Jul. 16, 2009, now Pat. No. 8,085,194.

(51) Int. Cl.
*G01S 19/05* (2010.01)

(52) U.S. Cl.
USPC .................................. 342/357.42

(58) Field of Classification Search
USPC .................................. 342/357.42
See application file for complete search history.

(56) References Cited

U.S. PATENT DOCUMENTS

| | | | |
|---|---|---|---|
| 7,586,438 B1 * | 9/2009 | Lawrence et al. | 342/357.4 |
| 8,085,194 B2 | 12/2011 | Abraham et al. | |
| 8,125,377 B2 * | 2/2012 | Harper et al. | 342/357.46 |
| 2008/0189037 A1 | 8/2008 | van Diggelen et al. | |
| 2009/0303118 A1 * | 12/2009 | Corazza et al. | 342/357.09 |
| 2010/0194634 A1 | 8/2010 | Biacs et al. | |

* cited by examiner

*Primary Examiner* — Harry Liu
(74) *Attorney, Agent, or Firm* — Sterne, Kessler, Goldstein & Fox PLLC

(57) ABSTRACT

A GNSS enabled mobile device receives GNSS assistance data in a determined format from a central processing station communicatively coupled to a wide area reference network (WARN). The WARN comprises a first plurality of GNSS tracking stations from which usable signals are received by the central processing station, and a second plurality of GNSS tracking stations from which unusable or no signals are received by the central processing station. The central processing station generates the GNSS assistance data using a complete set of GNSS reference feeds of the WARN. The complete set of GNSS reference feeds comprises actual GNSS reference feeds from the first plurality of GNSS tracking stations and virtual GNSS reference feeds derived for the second plurality of GNSS tracking stations from processed actual GNSS reference feeds. The generated GNSS assistance data is reformatted into a determined format and is communicated to the GNSS enabled mobile device, accordingly.

20 Claims, 6 Drawing Sheets

METHOD AND SYSTEM FOR A VIRTUAL WIDE AREA GNSS REFERENCE NETWORK

CROSS-REFERENCE TO RELATED APPLICATIONS/INCORPORATION BY REFERENCE

This patent application is a continuation of U.S. patent application Ser. No. 13/313,149, filed Dec. 7, 2011 which is a continuation of U.S. patent application Ser. No. 12/503,954, filed Jul. 16, 2009, now of U.S. Pat. No. 8,085,194, U.S. patent application Ser. No. 13/313,149, filed Dec. 7, 2011, is incorporated herein by reference in its entirety.

FIELD OF THE INVENTION

Certain embodiments of the invention relate to signal processing for communication systems. More specifically, certain embodiments of the invention relate to a method and system for a virtual wide area GNSS reference network.

BACKGROUND OF THE INVENTION

The market for Location-Based Services (LBS) is potentially tremendous. Location-Based Services may comprise services where information about the location of users or assets may be required. One state-of-the art technology driving the LBS market today is assisted global navigation satellite systems (AGNSS). This technology combines satellite positioning and communication networks such as mobile networks to reach performance levels allowing the wide deployment of Location-Based Services. AGNSS uses global navigation satellite system (GNSS) assistance data provided from an AGNSS server via, for example, a mobile telephony network, to speed up the process of acquiring a position fix of a GNSS enabled mobile device especially in a weak signal environment. The AGNSS server has access to a reference network of GNSS receivers that are placed in ideal locations (direct line-of-sight to satellites). The GNSS receivers comprise Global Positioning System (GPS) receivers, the Global Orbiting Navigation Satellite System (GLONASS) receivers, and/or the GALILEO system receivers. The reference network may be used as a source (feed) for providing the GNSS assistance data. Depending on the AGNSS server and GNSS receiver capabilities, the GNSS assistance data may comprise various elements such as ephemeris data and reference time. The GNSS assistance data may be delivered to the GNSS enabled mobile device via various standard-compliant mobile networks such as a 3GPP-compliant cellular network. The format of the GNSS assistance data may be defined by the relevant standards body. The specifics of the encoding and field ranges depend on the access technology. For example, protocols such as RRLP (Radio Resource LCS protocol) and Positioning Calculation Application Part (PCAP) are utilized for communicating the GNSS assistance data via GSM networks and UMTS networks, respectively. The GNSS assistance data speeds up acquisition of GNSS signals and increases GNSS sensitivity yield in weak signal environments such as an indoor environment. The GNSS assistance data helps to significantly reduce the search required by the GNSS enabled mobile device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a virtual wide area GNSS reference network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a virtual wide area GNSS reference network. In accordance with various exemplary embodiments of the invention, a GNSS enabled mobile device performs, using one or more processors and/or circuits in the GNSS enabled mobile device, receiving of GNSS assistance data from a central processing station communicatively coupled to a wide area reference network (WARN). The WARN comprises a first plurality of GNSS tracking stations from which usable signals are received by the central processing station, and a second plurality of GNSS tracking stations from which unusable or no signals are received by the central processing station. The central processing station generates GNSS assistance data based on a complete set of GNSS reference feeds of the WARN even without receiving usable GNSS reference feeds from the second plurality of GNSS tracking stations. The complete set of GNSS reference feeds of the WARN comprises actual GNSS reference feeds and virtual GNSS reference feeds. The actual GNSS reference feeds comprise GNSS reference feeds actually received by the central processing station from the first plurality of GNSS tracking stations. The actual GNSS reference feeds may be processed by the central processing station. The central processing station is configured to derive virtual GNSS reference feeds for each of the second plurality of GNSS tracking stations based on the processed actual GNSS reference feeds, complete GNSS satellite position information, and/or location information of corresponding GNSS tracking station. The central processing station may be enabled to generate a GNSS assistance data utilizing the actual GNSS reference feeds from the first plurality of GNSS tracking stations and the virtual GNSS reference feeds for the second plurality of GNSS tracking stations. The central processing station is operable to determine a particular format to represent the generated GNSS assistance data based on access technology such as CDMA, UMTS, LTE, and/or WiMAX supported by the GNSS enabled mobile device. The generated GNSS assistance data is reformatted into the determined particular format and communicated to the GNSS enabled mobile device, accordingly.

Figure 1:
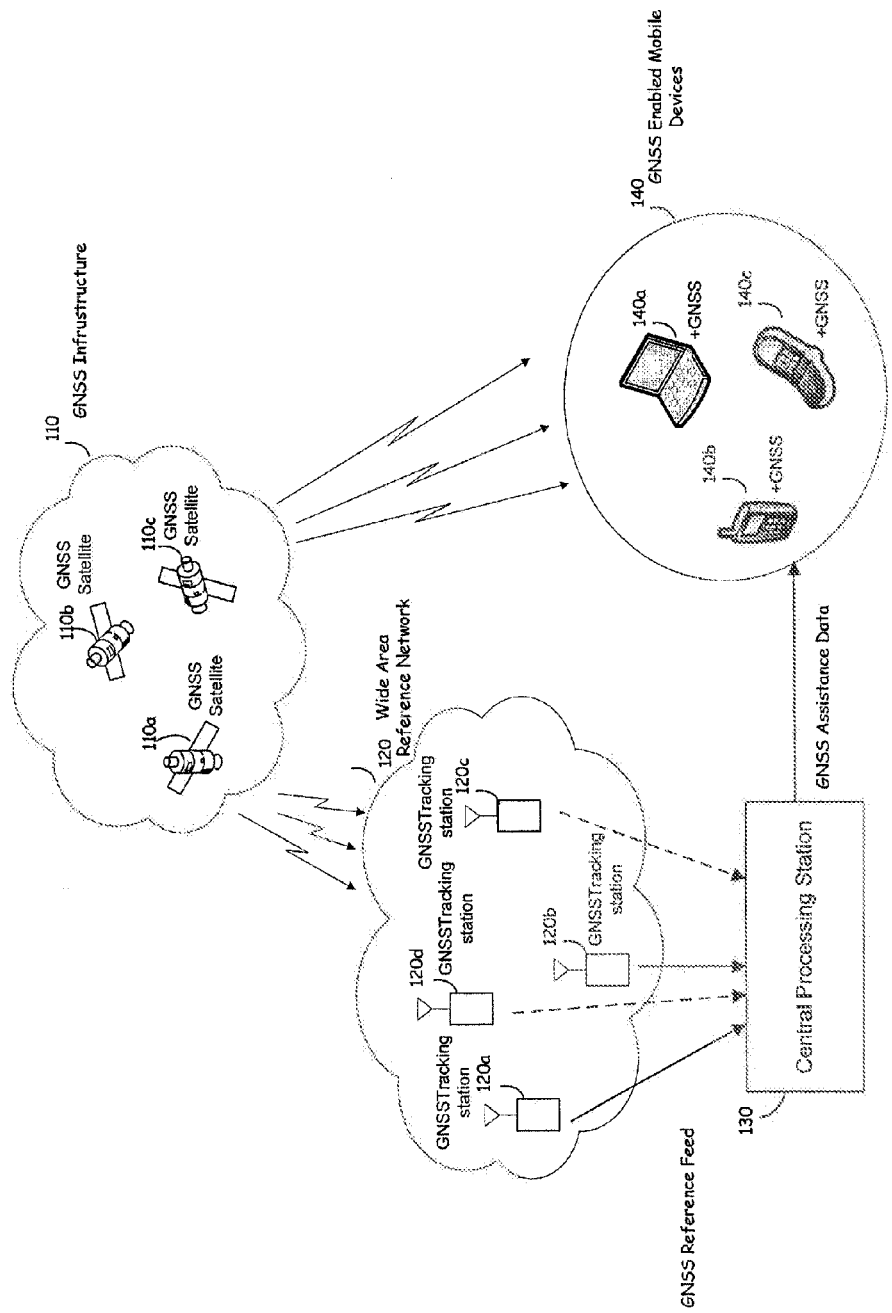
FIG. 1 is a diagram illustrating an exemplary communication system that utilizes virtual GNSS reference feeds to provide GNSS assistance data to a GNSS enabled mobile device, in accordance with an embodiment of the invention.

FIG. 1 is a diagram illustrating an exemplary communication system that utilizes virtual GNSS reference feeds to provide GNSS assistance data to a GNSS enabled mobile device, in accordance with an embodiment of the invention. Referring to FIG. 1, there is shown a communication system 100 comprising a GNSS infrastructure 110, a wide area reference network (WARN) 120, a central processing station 130, and a plurality of GNSS enabled mobile devices, of which a GNSS enabled notebook computer 140a, a GNSS enabled smartphone 140b, and a GNSS enabled mobile phone 140c are displayed. The GNSS infrastructure 110 comprises a plurality of GNSS satellites, of which GNSS satellites 140a-140c are displayed. The wide area reference network (WARN) 120 comprises a plurality of GNSS tracking stations, of which GNSS tracking stations 120a-120d are displayed.

The GNSS satellite infrastructure 110 may comprise suitable logic, circuitry, devices and/or interfaces, and/or optional code that provide navigation information to various GNSS receivers on the ground. The GNSS receivers, which comprise GPS, GALILEO and/or GLONASS receivers, are integrated within or externally coupled to GNSS enabled devices, for example, GNSS tracking stations such as the GNSS tracking station 120b and/or GNSS enabled mobile devices such as the GNSS enabled mobile phone 140c. The plurality of GNSS satellites such as the GNSS satellites 110a-110d may transmit GNSS data in a broadcast mode to GNSS receivers on the ground. The GNSS satellites 110a-110d may provide navigation references to GNSS receivers to determine position (latitude, longitude, altitude, and in some applications velocity) at corresponding GNSS receivers. The transmitted GNSS data may comprise satellite navigation information such as, for example, ephemeris and clock correction parameters. The ephemeris and clock correction data may provide a GNSS receiver information needed to compute the satellite position as a function of time, and/or to compute the satellite clock error parameter, also as a function of time.

The wide area reference network (WARN) 120 may comprise suitable logic, circuitry, devices and/or interfaces, and/ or optional code that may be enabled to collect and distribute GNSS data for GNSS satellites such as 110a through 110c on a continuous basis. The WARN 120 may comprise a plurality of GNSS tracking stations, for example, the GNSS tracking stations 120a-120d, located around the world to provide assistance GNSS (AGNSS) coverage all the time in both home network and visited network. Each of the GNSS tracking stations 120a-120d may comprise a GNSS receiver that acquires and tracks satellite signals from GNSS satellites such as the GNSS satellites 110a-110d in view. The GNSS tracking stations 120a-120d may be configured, for example, to extract satellite navigation information such as the ephemeris information, which uniquely identifies the position of each GNSS satellite, as well as satellite clock information from received broadcast GNSS data. The extracted satellite navigation information may be communicated as GNSS reference feeds with the central processing station 130 via a terrestrial land line network or other communication path such as, for example. Internet, fiber optic cable, and the like. The GNSS tracking stations 120a-120d may be required to transmit the extracted satellite navigation information to the central processing station 130 without significant delay. In turn, satellite navigation information for each of the GNSS satellites may be available and reliable to, for example, the GNSS enabled mobile phone 140c that needs them.

The GNSS tracking stations 120a-120d may be enabled to track satellite signals from GNSS satellites such as the GNSS satellites 110a-110d in open-sky conditions and operate continuously. The GNSS tracking stations 120a-120d are earth stations that may be placed at fixed locations around the earth and may be arranged at long distances, for example at several tens of kilometers. The GNSS tracking stations 120a-120d are characterized by large spacing in order to track each of GNSS satellites in view in real time. However, this may lead to results affected by high noise, transmission delay, degrading the accuracy of the communicated satellite navigation information from the GNSS tracking stations 120a-120d to the central processing station 130. As such, GNSS reference feeds provided by GNSS tracking stations such as the GNSS tracking stations 120c-120d may not be available or usable to the central processing station 130 in real time.

Accordingly, from the central processing station 130's perspective the WARN 120 comprises two different plurality of GNSS tracking stations. The first plurality of GNSS tracking stations comprises GNSS tracking stations, such as the GNSS tracking stations 120a and 120b, from which usable signals are received by the central processing station 130. The second plurality of GNSS tracking stations comprises GNSS tracking stations, such as the GNSS tracking stations 120c and 120d, from which unusable or no signals are received by the central processing station 130. In this regard, virtual GNSS reference feeds may be created at the central processing station 130 for the second plurality of GNSS tracking stations such as the GNSS tracking stations 120c-120d based on actual GNSS reference feeds received from the first plurality of GNSS tracking stations such as the GNSS tracking stations 120a-120b.

The central processing station 130 may comprise suitable logic, circuitry and/or interfaces, and/or optional code that may be enabled to collect extracted satellite navigation information such as ephemeris from the GNSS tracking stations 120a-120d. The central processing station 130 may be enabled to remove duplicate occurrences of the same GNSS reference feeds such as ephemeris and provide the latest GNSS reference feeds for redistribution to the GNSS enabled mobile devices 140. In instances where due to, for example, high noise and/or transmission delay, the actual GNSS reference feeds provided by the second plurality of GNSS tracking stations such as the GNSS tracking stations 120c-120d may not be available or usable at the central processing station 130, the central processing station 130 may be operable to derive virtual GNSS reference feeds for each of the second plurality of GNSS tracking stations such as the GNSS tracking stations 120c-120d by utilizing received actual GNSS reference feeds from the first plurality of GNSS tracking stations, for example, the GNSS tracking stations 120a-120b.

The central processing station 130 is configured to interpret and utilize the derived virtual GNSS reference feeds just as if they had come from the second plurality of GNSS tracking stations such as the GNSS tracking stations 120c-120d. The central processing station 130 is enabled to process actual GNSS reference feeds received from the first plurality of GNSS tracking stations at different geographic locations, for example, the GNSS tracking stations 120a-120b. The central processing station 130 may be enabled to reverse engineer the actual GNSS reference feeds received from the first plurality of GNSS tracking stations such as the GNSS tracking stations 120a-120b. The central processing station 130 may be configured to apply complete knowledge of GNSS satellites' position to the processed actual GNSS reference feeds to derive virtual GNSS reference feeds for each of the second plurality of GNSS tracking stations, for example, the GNSS tracking stations 120c-120d. The central processing station 130 may be enabled to form a complete set of GNSS reference feeds comprising the actual GNSS reference feeds received from the first plurality of GNSS tracking stations, for example, the GNSS tracking stations 120a-120b, and derived virtual GNSS reference feeds for the second plurality of GNSS tracking stations, for example, the GNSS tracking stations 120c-120d. The central processing station 130 may be enabled to generate GNSS assistance data from the complete set of GNSS reference feeds. The generated GNSS assistance data may comprise, for example, ephemeris, almanac, accurate time and satellite status. The central processing station 130 is operable to interpret and utilize virtual GNSS reference feeds in the complete set of GNSS reference feeds just as if the virtual GNSS reference feeds have been received from the second plurality of GNSS tracking stations such as the GNSS tracking stations 120c-120d. The generated assistance data may be represented in a format depending on, for example, a location server, the WARN 120, and access technology such as CDMA supported by the GNSS enabled mobile devices 140. The central processing station 130 may be enabled to redistribute the generated GNSS assistance data to the GNSS enabled mobile devices 140 over, for example, various wireless or wired communication networks.

The GNSS enabled mobile devices 140 such as the GNSS enabled mobile phone 140c may comprise suitable logic, circuitry and/or interfaces, and/or optional code that may be enabled to communicate with the central processing station 130 via wireless or wired communication networks. For example, the GNSS enabled mobile phone 140c may be capable of communicating with the central processing station 130 using various wireless standard protocols such as, for example, UMTS, CDMA, WiFi, and WiMAX. The GNSS enabled mobile phone 140c may be enabled to receive GNSS signals from a plurality of GNSS satellites such as the GNSS satellites 110a through 110c to determine a position fix of the GNSS enabled mobile phone 140c. The GNSS enabled mobile phone 140c may be configured to utilize the redistributed GNSS assistance data from the central processing station 130 to aid in detecting GPS signals from GNSS satellites such as GNSS satellites 110a-110c in a satellite constellation. A quick position fix for the GNSS enabled mobile phone 140c may be achieved based on GNSS assistance data acquired from the central processing station 130. In addition, the GNSS enabled mobile phone 140c is operable to enhance its sensitivity in various ways based on received GNSS assistance data. For example, the GNSS enabled mobile phone 140c may be enabled to utilize the GNSS assistance data to detect weak GNSS signals that the GNSS enabled mobile phone 140c would not ordinarily be able to detect.

In operation, the GNSS tracking stations 120a-120d in the WARN 120 may be placed at fixed locations in open-sky conditions and may be configured to operate continuously to track GNSS signals for each of GNSS satellites such as the GNSS satellites 110a-110c of the GNSS infrastructure 110. The large spacing characteristics of the GNSS tracking stations 120a-120d may result in GNSS reference feeds from the second plurality of GNSS tracking stations such as the GNSS tracking stations 120c-120d may not be available or usable in real-time to the central processing station 130. In this regard, the central processing station 130 may be configured to derive virtual GNSS reference feeds for the second plurality of GNSS tracking stations such as the GNSS tracking stations 120c-120d by utilizing received actual GNSS reference feeds from the first plurality of GNSS tracking stations at different locations, for example, the GNSS tracking stations 120a-120b. In addition, the central processing station 130 may utilize complete knowledge of GNSS satellites' position and corresponding location information of the second plurality of GNSS tracking stations in the derivation of the virtual GNSS reference feeds. The central processing station 130 is enabled to interpret and utilize the derived virtual GNSS reference feeds just as if they had come from the second plurality of GNSS tracking stations such as the GNSS tracking stations 120c-120d. A complete set of GNSS reference feeds may be formed by combining the received actual GNSS reference feeds from the first plurality of GNSS tracking stations and the derived virtual GNSS reference feeds for the second plurality of GNSS tracking stations. GNSS assistance data may be generated based on the complete set of GNSS reference feeds. The central processing station 130 may be enabled to represent the generated GNSS assistance data in a determined format depending on, for example, the WARN 120 and access technology such as CDMA. The central processing station 130 may be enabled to deliver the generated GNSS assistance data to one or more GNSS enabled mobile devices such as the GNSS enabled mobile phone 140c. The GNSS enabled mobile phone 140c may be enabled to utilize the GNSS assistance data from the central processing station 130, for example, for calculating a quick position fix and/or enhancing device sensitivity to GNSS signals.

Figure 2:
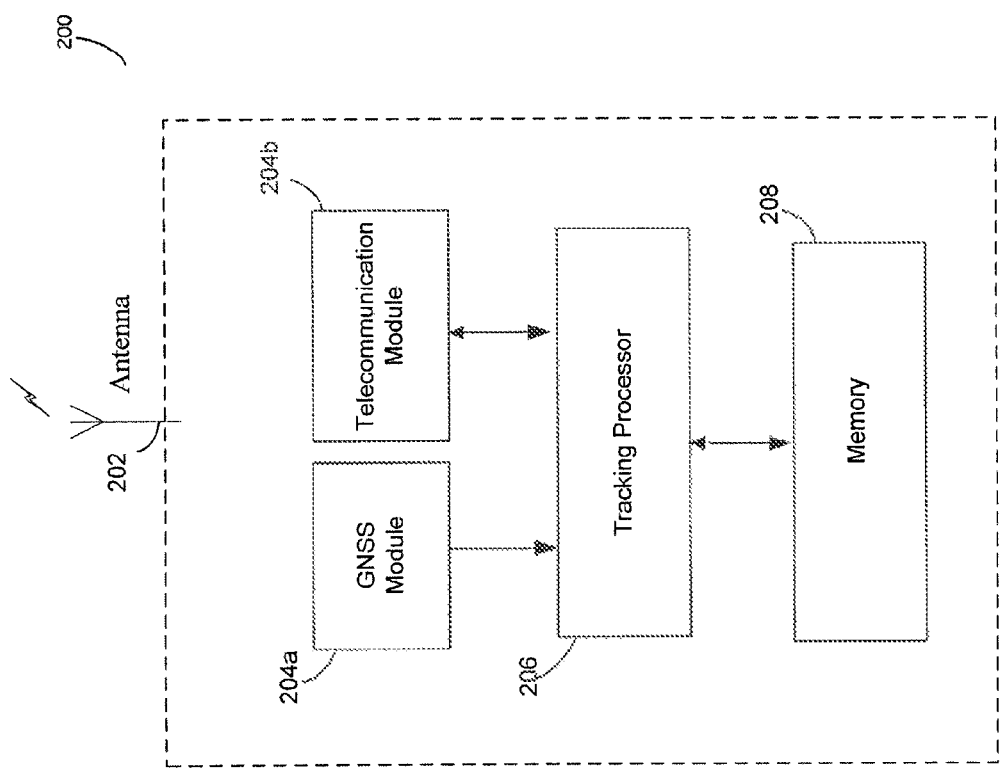
FIG. 2 is a diagram illustrating an exemplary GNSS tracking station that is operable to collect and provide actual GNSS reference feeds to a central processing station, in accordance with an embodiment of the invention.

FIG. 2 is a diagram illustrating an exemplary GNSS tracking station that is operable to collect and provide actual GNSS reference feeds to a central processing station, in accordance with an embodiment of the invention. Referring to FIG. 2, there is shown a GNSS tracking station 200 comprising an antenna 202, a GNSS module 204a, a telecommunication module 204b, a tracking processor 206, a reference position database 208, and a memory 210.

The antenna 202 may comprise suitable logic, circuitry and/or interfaces, and/or optional code that may be enabled to collect GNSS signals from a plurality of GNSS satellites such as the GNSS satellites 110a through 110c and may be capable of communicating the collected GNSS signals with the central processing station 130 to provide a GNSS reference feed. The antenna 202 may be a single antenna for collecting GNSS signals from the GNSS satellite 140a through 140c and transmitting the collected GNSS signals to the central processing station 130. The antenna 202 may comprise separate antenna for receiving GNSS signals from the GNSS satellite 110a through 110c and transmitting a GNSS reference feed to the central processing station 130, respectively.

The GNSS module 204a may comprise suitable logic, circuitry and/or interfaces, and/or optional code that may be enabled to receive GNSS satellite broadcast signals via the antenna 202 and convert them to GNSS baseband signals, which may be suitable for further processing in the tracking processor 206 to provide GNSS reference feeds to the central processing station 130 via the telecommunication module 204b.

The telecommunication module 204b may comprise suitable logic, circuitry and/or interfaces, and/or optional code that may be enabled to transmit signals comprising GNSS reference feeds to the central processing station 130. The telecommunication module 204b may be enabled to communicate with the central processing station 130 over a wired or a wireless communication network.

The tracking processor 206 may comprise suitable logic, circuitry and/or interfaces, and/or optional code that may be enabled to process received GNSS signals and provide GNSS reference feeds to the central processing station 130 via the telecommunication module 204b. The tracking processor 206 may be configured to extract navigational information from received GNSS signals to provide GNSS reference feeds to the central processing station 130.

The memory 208 may comprise suitable logic, circuitry, and/or interfaces, and/or optional code that may enable storing of information such as executable instructions and data that may be utilized by the tracking processor 206. The executable instructions may comprise algorithms that may be enabled to extract satellite navigation information from received GNSS signals. The data may comprise received GNSS signals and extracted satellite navigation information. The extract satellite navigation information from received GNSS signals may be formed as GNSS reference feeds to provide to the central processing station 130. The GNSS reference feed may be updated on an as a needed base or periodically. The memory 210 may comprise RAM, ROM, low latency nonvolatile memory such as flash memory and/or other suitable electronic data storage.

In operation, a plurality of GNSS signals may be received at the antenna 202 coupled to the GNSS tracking station 200. The received plurality of GNSS signals may be measured and communicated to the GNSS module 204a. The GNSS module 204a may convert the received GNSS signals to corresponding baseband signals and communicate to the tracking processor 206. The tracking processor 206 may be enabled to extract satellite navigation information from the received GNSS signals to provide GNSS reference feeds to the central processing station 130 via the telecommunication module 204b.

Figure 3:
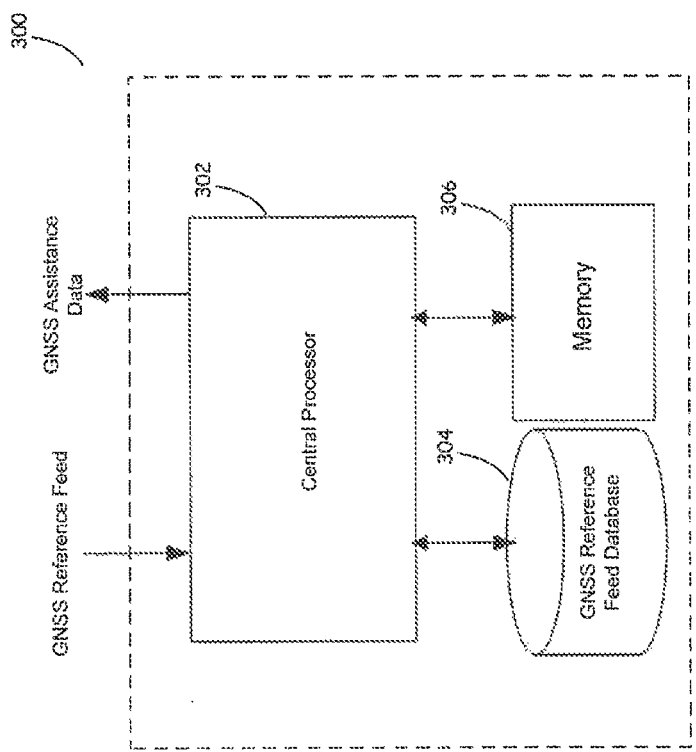
FIG. 3 is a diagram illustrating an exemplary central processing station that is operable to provide GNSS assistance data to a GNSS enabled mobile device based on virtual GNSS reference feeds, in accordance with an embodiment of the invention.

FIG. 3 is a diagram illustrating an exemplary central processing station that is operable to provide GNSS assistance data to a GNSS enabled mobile device based on virtual GNSS reference feeds, in accordance with an embodiment of the invention. Referring to FIG. 3, there is shown a central processing station 300 comprising a central processor 302, a GNSS reference feed database 304, and a memory 306.

The central processor 302 may comprise suitable logic, circuitry and/or interfaces, and/or optional code that may be enabled to collect GNSS reference feeds such as ephemeris from each of the associated GNSS tracking stations 120a-120d of the WARN 120. The central processor 302 may be enabled to remove duplicate occurrences of, for example, the same ephemeris and provide the latest ephemeris data for redistribution to the GNSS enabled mobile devices 140. The central processor 302 may be enabled to calculate a position fix for a particular site of, for example, the GNSS enabled mobile phone 140c, the central processing station 130 itself, or some other sites of interest. The central processor 302 may be enabled to communicate with the GNSS enabled mobile devices 140 over, for example, a landline or other communications path that couples the GNSS enabled mobile devices 140 to the central processing station 300. The central processor 302 may be enabled to provide a complete set of GNSS reference feeds for generating GNSS assistance data.

From the central processing station 130's perspective, the WARN 120 comprises a first plurality of GNSS tracking stations from which usable signals are received by the central processing station 130. The WARN 120 also comprises a second plurality of GNSS tracking stations from which unusable or no signals are received due to, for example, high noise and/or significant transmission delay, by the central processing station 130. In this regard, the central processor 302 may be enabled to derive virtual GNSS reference feeds for each of the second plurality of GNSS tracking stations such as the GNSS tracking station 120c by utilizing actual GNSS reference feeds received from different GNSS tracking stations, for example, the first plurality of GNSS tracking stations such as the GNSS tracking stations 120a-120b.

The central processor 302 may be enabled to interpret and utilize the derived virtual GNSS reference feeds for the second plurality of GNSS tracking stations such as the GNSS tracking station 120c-120d just as if they had been received from the GNSS tracking station 120c-120d. The central processor 302 may be configured to reverse engineer the actual GNSS reference feeds received from the first plurality of GNSS tracking stations such as the GNSS tracking stations 120a-120b. The central processor 302 may be enabled to apply complete knowledge of GNSS satellites' location to the processed actual GNSS reference feeds to derive corresponding virtual GNSS reference feeds for each of the second plurality of GNSS tracking stations such as the GNSS tracking station 120c. A complete set of GNSS reference feeds may be utilized by the central processor 302 to generate GNSS assistance data. The generated GNSS assistance data may comprise various navigation elements, for example, ephemeris, almanac, accurate time and satellite status. The complete set of GNSS reference feeds may comprise actual GNSS reference feeds and virtual GNSS reference feeds. The actual GNSS reference feeds may be GNSS reference feeds actually received from the first plurality of GNSS tracking stations, for example, the GNSS tracking station 120a-120b via the GNSS module 204a. The virtual GNSS reference feeds for the second plurality of GNSS tracking station such as the GNSS tracking station 120c may be derived from actual GNSS reference feeds received from the first plurality of GNSS tracking stations such as the GNSS tracking stations 120a-120b. The central processor 302 may be enabled to interpret and utilize virtual GNSS reference feeds just as if they have come from the second plurality of GNSS tracking stations such as the GNSS tracking station 120c. The central processor 302 may be enabled to represent the generated GNSS assistance data in a format depending on, for example, the WARN 120 and access technology such as CDMA. The central processing station 130 may be enabled to deliver the generated assistance data to the GNSS enabled mobile devices 140 over, for example, various wireless or wired communication networks.

The GNSS reference feed database 304 may comprise suitable logic, circuitry, and/or interfaces, and/or optional code that may be operable to manage and/or store data comprising GNSS reference feeds and/or corresponding location information of associated GNSS tracking stations of the WARN 120. In this regard, the GNSS reference feed database 304 may comprise actual GNSS reference feeds received from the first plurality of GNSS tracking stations such as the GNSS tracking stations 120a-120b. The GNSS reference feed database 304 may comprise virtual GNSS reference feeds derived for the second plurality of GNSS tracking stations such as the GNSS tracking station 120c. The contents in the GNSS reference feed database 304 may be updated as a needed base or periodically.

The memory 306 may comprise suitable logic, circuitry, and/or interfaces, and/or optional code that may enable storing of information such as executable instructions that may be utilized by the central processor 302. The executable instructions may comprise algorithms that may be utilized to process actual GNSS reference feeds received from the first plurality of GNSS tracking stations such as the GNSS tracking stations 120a-120b. The executable instructions may comprise algorithms that may be utilized to derive virtual GNSS reference feeds for the second plurality of such as the GNSS tracking station 120c from actual GNSS reference feeds received from the first plurality of GNSS tracking stations such as the GNSS tracking stations 120a-120b. The memory 306 may comprise generated GNSS assistance data from a complete set of GNSS reference feeds. The memory 306 may comprise RAM, ROM, low latency nonvolatile memory such as flash memory and/or other suitable electronic data storage.

In operation, the central processor 302 may be enabled to collect GNSS reference feeds such as ephemeris from each of the associated GNSS tracking stations such as the GNSS tracking stations 120a-120d of the WARN 120. The central processor 302 may be enabled to process the GNSS reference feeds received from the first plurality of GNSS tracking stations such as the GNSS tracking stations 120a-120b. For the second plurality of GNSS tracking stations such as the GNSS tracking stations 120c-120d from which unusable or no signals are received by the central processing station 300 due to, for example, transmission delay, the central processor 302 may be enabled to derive virtual GNSS reference feeds for each of the second plurality of GNSS tracking stations such as the GNSS tracking station 120c by utilizing complete knowledge of GNSS satellites, corresponding location information of the GNSS tracking station 120c, and processed actual GNSS reference feeds from the first plurality of GNSS tracking stations such as the GNSS tracking stations 120a-120b. Various algorithms stored in the memory 306 may be utilized for processing actual GNSS reference feeds and/or deriving virtual GNSS reference feeds.

Figure 4:
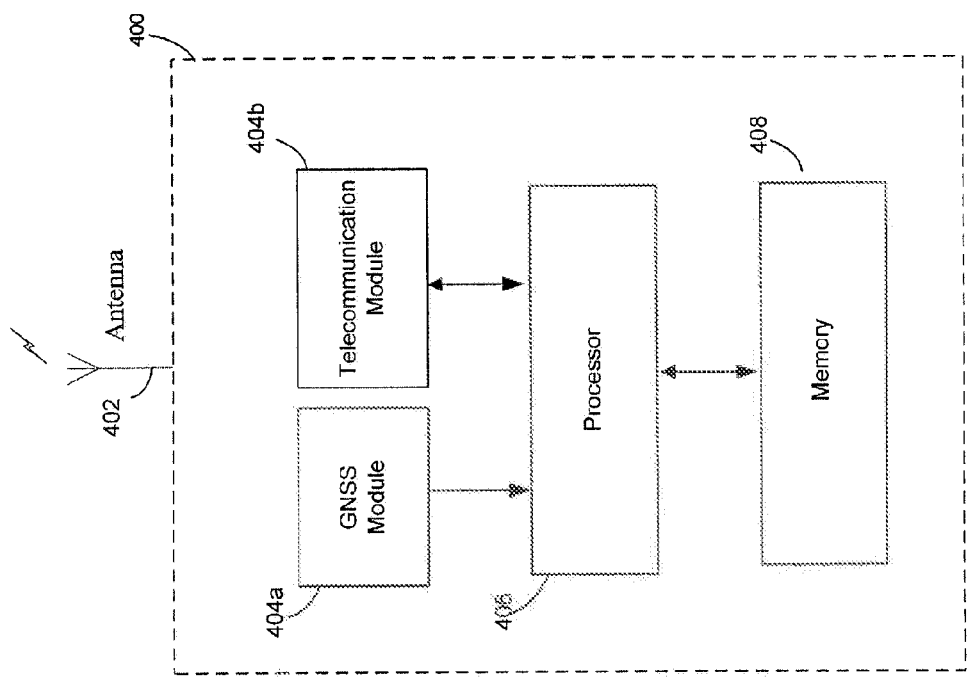
FIG. 4 is a diagram illustrating an exemplary GNSS enabled mobile device that is operable to determine a position fix utilizing GNSS assistance data derived from virtual GNSS reference feeds, in accordance with an embodiment of the invention.

FIG. 4 is a diagram illustrating an exemplary GNSS enabled mobile device that is operable to determine a position fix utilizing GNSS assistance data derived from virtual GNSS reference feeds, in accordance with an embodiment of the invention. Referring to FIG. 4, there is shown a GNSS enabled mobile device 400 comprising an antenna 402, a GNSS front end 404a, a telecommunication front end 404b, a processor 406, and a memory 408.

The antenna 402 may comprise suitable logic, circuitry and/or interfaces, and/or optional code that may be enabled to receive GNSS signals from a plurality of GNSS satellites such as the GNSS satellites 110a through 110c. The antenna 402 may be capable of transmitting and/or receiving radio signals, for example, via an air interface such as CDMA and/or WiMAX. The antenna 402 may be a single antenna for communicating GNSS signals from the GNSS satellite 110a through 110c and radio signals over an air interface such as CDMA. The antenna 402 may comprise separate antenna communicating GNSS signals from the GNSS satellite 110a through 110c and radio signals over an air interface such as CDMA and/or WiMAX, respectively.

The GNSS front end 404a may comprise suitable logic, circuitry and/or interfaces, and/or optional code that may be enabled to receive GNSS satellite broadcast signals via the antenna 402 and convert them to GNSS baseband signals, which may be suitable for further processing in the processor 406 for a navigation solution.

The telecommunication front end 404b may comprise suitable logic, circuitry and/or interfaces, and/or optional code that may be enabled to transmit and/or receive radio signals over an air interface such as CDMA and/or WiMAX via the antenna 402 and convert them to corresponding baseband signals, which may be suitable for further processing in the processor 406.

The processor 406 may comprise suitable logic, circuitry and/or interfaces, and/or optional code that may be enabled to process received satellite signals as well as signals received over an air interface such as CDMA and/or WiMAX. The processor 406 may be configured to extract navigational information from each received GNSS signal to compute a position fix associated with the GNSS enabled mobile device 400. The processor 406 may be enabled to acquire GNSS assistance data from the central processing station 130. In return, the processor 406 may be enabled to receive acquired GNSS assistance data generated based on a complete set of GNSS reference feeds comprising actual GNSS reference feeds and virtual GNSS reference feeds. The processor 406 may be programmed to calculate the position fix by combining local GNSS measurements with the acquired GNSS assistance data.

The memory 408 may comprise suitable logic, circuitry, and/or code interfaces, and/or optional that may enable storage of information such as executable instructions and data that may be utilized by the processor 406. The executable instructions may comprise algorithms that may be enabled to calculate a position fix using local GNSS measurements and/or GNSS assistance data acquired from the central processing station 130. The data may comprise local GNSS measurements and location data. The local GNSS measurements may be associated with the satellite signals directly received from the GNSS satellite 110a through 110c. The location data may comprise calculated position fix of the GNSS enabled mobile device 400. The memory 408 may comprise RAM, ROM, low latency nonvolatile memory such as flash memory and/or other suitable electronic data storage.

Figure 5:
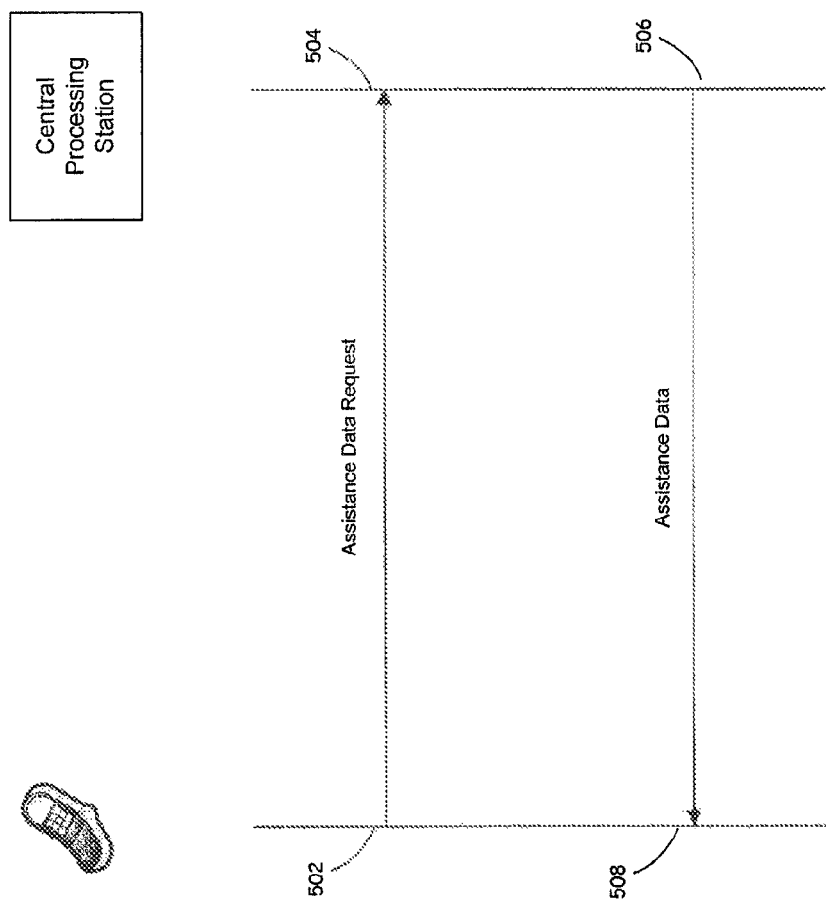
FIG. 5 is an exemplary call flow that illustrates exemplary steps in which a GNSS enabled mobile device acquires GNSS assistance data derived from virtual GNSS reference feeds, in accordance with an embodiment of the invention.

In an exemplary operation, a position fix of the GNSS enabled mobile device 400 may be requested. The processor 402 may be enabled to communicate with the central processing station 130 via the telecommunication front end 404b. In return, the processor 402 may be enabled to receive GNSS assistance data generated by the central processing station 130. The processor 302 may be enabled to determine a position fix for the GNSS enabled mobile device 400 using various algorithms stored in the memory 406 based on the acquired GNSS assistance data together with the local GNSS measurement via the GNSS front end 404a. FIG. 5 is an exemplary call flow that illustrates exemplary steps in which a position fix of a GNSS enabled mobile device is determined using GNSS assistance data derived from virtual GNSS reference feeds, in accordance with an embodiment of the invention.

FIG. 5 is an exemplary call flow that illustrates exemplary steps in which a GNSS enabled mobile device acquires GNSS assistance data derived from virtual GNSS reference feeds, in accordance with an embodiment of the invention. Referring to FIG. 5, the exemplary steps start with step 502, where a GNSS enabled mobile device such as the GNSS enabled mobile phone 140c may request GNSS assistance data from the central processing station 130.

In step 504, upon the reception of the request for GNSS assistance data from the GNSS enabled mobile device 140c, the central procession station 130 may be enabled to generate GNSS assistance data from a complete set of GNSS reference feeds. The contents of the complete set of GNSS reference feeds are provided by associated GNSS tracking stations in the WARN 120. From the central processing station 130's perspective, the WARN 120 comprises a first plurality of GNSS tracking stations from which usable signals are received by the central processing station 130. The WARN also comprises a second plurality of GNSS tracking stations from which unusable or no signals are received by the central processing station 130. The complete set of GNSS reference feeds comprises actual GNSS reference feeds and virtual GNSS reference feeds. The actual GNSS reference feeds may be received by the central processing station 130 from the first plurality of GNSS tracking stations, for example, the GNSS tracking stations 120a-120b. The virtual GNSS reference feeds may be for the second plurality of GNSS tracking stations such as the GNSS tracking station 120c, which fails to provide usable GNSS reference feeds to the central processing station 130. The central processing station 130 may be enabled to derive virtual GNSS reference feeds for the second plurality of GNSS tracking stations such as the GNSS tracking station 120c based on actual GNSS reference feeds from different GNSS tracking stations like the first plurality of GNSS tracking stations such as the GNSS tracking stations 120a-120b.

In step 506, the central processing station 130 may determine a format to represent the generated GNSS assistance data based on for example, access technology such as CDMA supported by the GNSS enabled mobile device 140c. The central processing station 130 may be configured to reformat the generated GNSS assistance data using into the determined format and communicate to the GNSS enabled mobile device 140c, accordingly.

In step 508, the GNSS enable mobile phone 140c may be enabled to receive GNSS assistance data from the central processing station 130. The GNSS enabled mobile phone 140 is operable to determine an associated position fix based on the received GNSS assistance data, accordingly. The determined associated position fix for the GNSS enabled mobile device 140c may be utilized, for example, to enable a location-based service (LBS) application on the GNSS enabled mobile device 140c.

Figure 6:
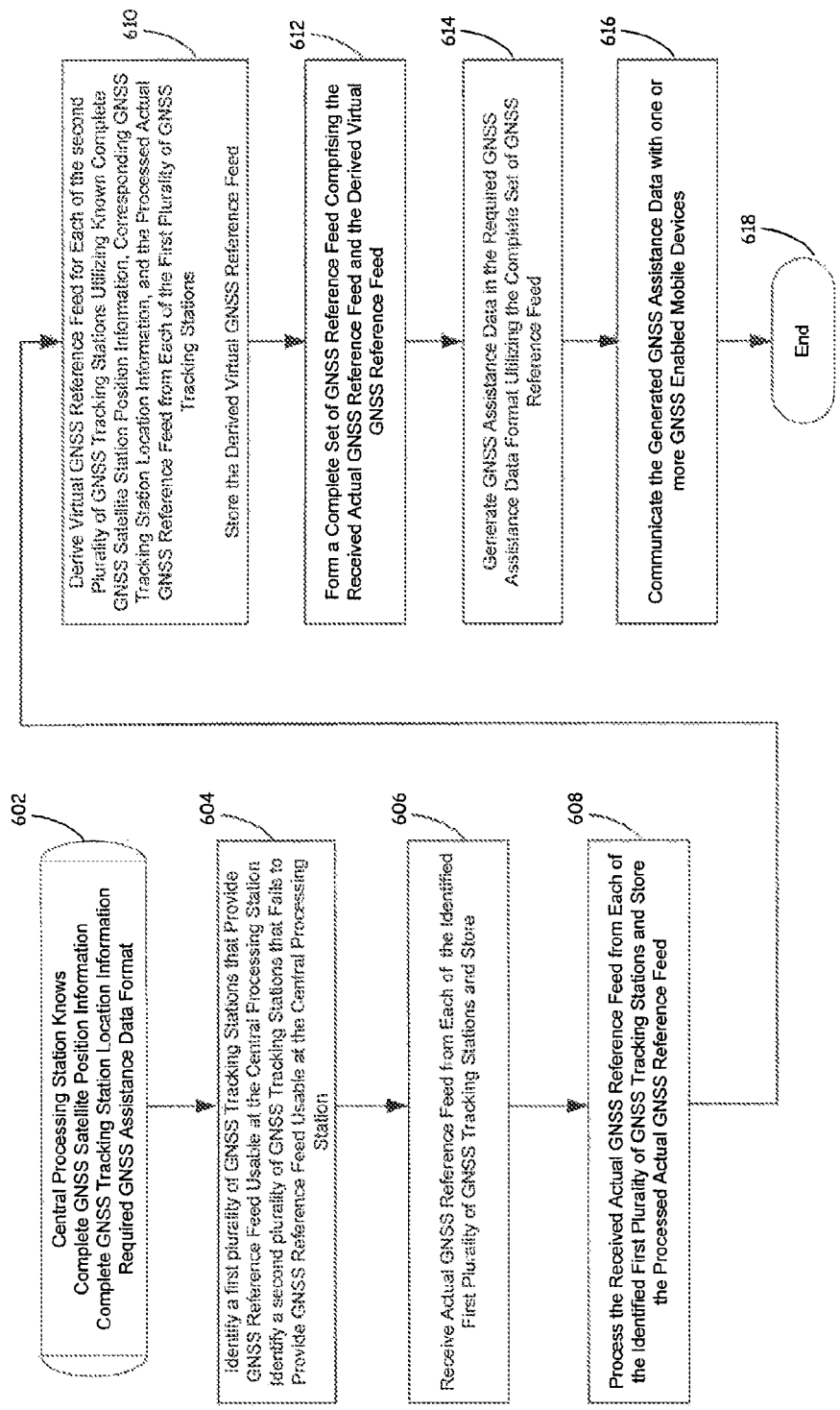
FIG. 6 is a flow chart illustrating exemplary steps in which GNSS assistance data is generated utilizing both actual GNSS reference feeds and virtual GNSS reference feeds, in accordance with an embodiment of the invention.

FIG. 6 is a flow chart illustrating exemplary steps in which GNSS assistance data is generated utilizing both actual GNSS reference feeds and virtual GNSS reference feeds, in accordance with an embodiment of the invention. Referring to FIG. 6, the exemplary steps start with step 602, where the central processing station 130 has knowledge of complete GNSS satellite position information of the GNSS satellite infrastructure 110, complete GNSS tracking station location information, a required GNSS assistance data format.

In step 604, the central processing station 130 may be enabled to identify a first plurality of GNSS tracking stations and a second plurality of GNSS tracking stations. The first plurality of GNSS tracking stations such as the GNSS tracking stations 120a-120b provide GNSS reference feeds usable, for example, to generate GNSS assistance data at the central processing station 130. The second plurality of GNSS tracking stations such as the GNSS tracking stations 120c-120d provide GNSS reference feeds not usable due to, for example, high noise and/or significant transmission delay, at the central processing station 130 to generate GNSS assistance data.

In step 606, the central processing station 130 may be enabled to receive actual GNSS reference feeds from each of the identified first plurality of GNSS tracking stations such as the GNSS tracking stations 120a-120b and store the received actual GNSS reference feeds in the GNSS reference feed database 304.

In step 608, the central processor 302 may be enabled to process the received actual GNSS reference feeds from the identified first plurality of GNSS tracking stations, for example, the GNSS tracking stations 120a-120b, respectively, and store the processed actual GNSS reference feeds in the GNSS reference feed database 304.

In step 610, the central processor 302 may be enabled to derive virtual GNSS reference feeds for the identified second plurality of GNSS tracking stations such as the GNSS tracking stations 120c-120d, which fails to provide GNSS reference feeds usable at the central processing station 130, for example, to generate GNSS assistance data. The virtual GNSS reference feeds for each of identified second plurality of GNSS tracking stations, for example, the GNSS tracking stations 120c-120d, may be determined based on known complete GNSS satellite station position information, corresponding GNSS tracking station location information, and the processed actual GNSS reference feeds from each of identified first plurality of GNSS tracking stations such as the GNSS tracking stations 120a-120b. The derived virtual GNSS reference feeds may be stored in the GNSS reference feed database 304.

In step 612, the central processor 302 may be enabled to form a complete set of GNSS reference feeds. The complete set of GNSS reference feeds comprises the received actual GNSS reference feeds from the identified first plurality of GNSS tracking stations and the derived virtual GNSS reference feeds for the identified second plurality of GNS tracking stations.

In step 614, the central processor 302 may be enabled to generate GNSS assistance data in the required GNSS assistance data format utilizing the complete set of GNSS reference feeds. The format of the GPS acquisition assistance data depends on corresponding access technology such as CDMA utilized by the GNSS enabled mobile devices 140.

In step 616, the central processor 302 may be enabled to communicate the generated GNSS assistance data with one or more GNSS enabled mobile devices such as the GNSS enabled mobile phone 140c. The exemplary process stops in step 618.

Aspects of a method and system for a virtual wide area GNSS reference network are provided. In accordance with various exemplary embodiments of the invention, a GNSS enabled mobile device such as, for example, the GNSS enabled mobile phone 140c, may comprise processors and/or circuits, for example, the processor 406 and the telecommunication module 404b, to be utilized to receive GNSS assistance data from a central processing station such as the central processing station 130. The central processing station 130 may be communicatively coupled to the wide area reference network (WARN) 120. The WARN 120 comprise a first plurality of GNSS tracking stations from which usable signals are received by the central processing station 130, and a second plurality of GNSS tracking stations from which unusable or no signals are received by the central processing station 130 due to, for example, significant transmission delay.

The central processing station 130 may be operable to generate GNSS assistance data requested by the GNSS enabled mobile phone 140c based on a complete set of GNSS reference feeds of the WARN 120 even without receiving usable GNSS reference feeds from the second plurality of GNSS tracking stations such as the GNSS tracking stations 120c-120d. The complete set of GNSS reference feeds of the WARN 120 comprises actual GNSS reference feeds and virtual GNSS reference feeds of the WARN 120. As described with respect to FIG. 1-FIG. 3; the actual GNSS reference feeds comprise GNSS reference feeds actually received by the central processing station 130 from the first plurality of GNSS tracking stations such as the GNSS tracking station 120a-120b. The actual GNSS reference feeds from the first plurality of GNSS tracking stations such as the GNSS tracking station 120a-120b may be processed by the central processor 302. The central processor 302 may be enabled to derive the virtual GNSS reference feeds for the second plurality of GNSS tracking stations such as the GNSS tracking stations 120c-120d based on the processed actual GNSS reference feeds, complete GNSS satellite position information, and/or location information of corresponding GNSS tracking station.

The central processor 302 may be operable to generate requested GNSS assistance data utilizing the actual GNSS reference feeds from the first plurality of GNSS tracking stations such as the GNSS tracking station 120a-120b and the virtual GNSS reference feeds derived for the second plurality of GNSS tracking stations such as the GNSS tracking station 120c-120d. The central processing station 130 may be configured to determine a particular format to represent the generated GNSS assistance data based on access technology supported by the GNSS enabled mobile phone 140c. The supported access technology may be CDMA UMTS, LTE, and/or WiMAX. The central processing station 130 may be enabled to reformat the generated GNSS assistance data into the determined particular format. The central processing station 130 may be enabled to communicate the reformatted GNSS assistance data with the GNSS enabled mobile phone 140c utilizing the supported access technology such as CDMA and/or WiMAX.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a virtual wide area GNSS reference network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating assistance data, comprising:
   receiving, by a central processing station, a plurality of actual reference feeds from among a plurality of reference feeds, wherein the plurality of actual reference feeds correspond to a first plurality of tracking stations from among a plurality of tracking stations, and wherein the plurality of actual reference feeds correspond to a location of a satellite;
   deriving, by the central processing station, a plurality of virtual reference feeds from among the plurality of reference feeds based upon the plurality of actual reference feeds, wherein the plurality of virtual reference feeds correspond to a second plurality of tracking stations from among the plurality of tracking stations; and
   generating, by the central processing station, the assistance data for communication to a mobile device based upon the plurality of actual reference feeds and the plurality of virtual reference feeds.

2. The method according to claim 1, further comprising:
   identifying the first plurality of tracking stations as being tracking stations from among the plurality of tracking stations that provide useable reference feeds from among the plurality of reference feeds; and
   identifying the second plurality of tracking stations as being tracking stations from among the plurality of tracking stations that provide unusable reference feeds from among the plurality of reference feeds.

3. The method according to claim 2, wherein identifying the second plurality of tracking stations comprises:
   identifying reference feeds from among the plurality of reference feeds with a noise or transmission delay greater than a noise or transmission delay of the useable reference feeds as the unusable reference feeds.

4. The method according to claim 1, further comprising:
   processing the plurality of actual reference feeds, wherein deriving the plurality of virtual reference feeds comprises:
   deriving the plurality of virtual reference feeds based on the plurality of processed actual reference feeds, satellite position information, or location information of a corresponding tracking station from among the plurality of tracking stations.

5. The method according to claim 1, further comprising:
   determining a particular format to represent the generated assistance data based on access technology of the mobile device; and
   reformatting the generated assistance data into the determined particular format.

6. The method according to claim 1, further comprising:
   combining the plurality of actual reference feeds and the plurality of virtual reference feeds to provide a set of reference feeds, wherein generating the assistance data comprises:
   generating the assistance data for communication to a mobile device based upon the set of reference feeds.

7. The method of claim 1, further comprising:
   deriving the plurality of virtual reference feeds based on the plurality of actual reference feeds and information regarding the location of the satellite.

8. The method of claim 7, wherein the information regarding the location of the satellite comprises information regarding the location of the satellite with respect to the actual reference feeds.

9. The method of claim 1, further comprising:
deriving the plurality of virtual reference feeds based on the plurality of actual reference feeds and information regarding a second location of a tracking station in the second plurality of tracking stations.

10. A system for generating assistance data from signals that include useable signals from a first plurality of tracking stations and unusable signals from a second plurality of tracking stations, comprising:
a central station configured to:
receive the usable signals, wherein the usable signals correspond to a location of a satellite,
derive, based on the usable signals, virtual reference feeds corresponding to the unusable signals, and
generate assistance data for communication to one or more mobile devices, the assistance data being based on actual reference feeds corresponding to the usable signals and the virtual reference feeds.

11. The system of claim 10, wherein the central station is communicatively coupled to the first plurality of tracking stations and the second plurality of tracking stations.

12. The system of claim 11, wherein the central station is configured to receive the usable signals and the unusable signals from the first plurality of tracking stations and the second plurality of tracking stations, respectively.

13. The system of claim 11, wherein the central station is configured to:
receive the actual reference feeds from the first plurality of tracking stations; and
derive the virtual reference feeds that correspond to the second plurality of tracking stations from the actual reference feeds.

14. A central processing station for generating assistance data, comprising:
a reference database configured to store a plurality of actual reference feeds from among a plurality of reference feeds that correspond to a first plurality of tracking stations;
a memory configured to store an algorithm to derive a plurality of virtual reference feeds from among the plurality of reference feeds that correspond to a second plurality of tracking stations based upon the plurality of actual reference feeds; and
a central processor configured to:
retrieve the plurality of actual reference feeds from the reference database,
execute the algorithm stored in the memory to derive the plurality of virtual reference feeds, and
generate the assistance data for communication to a mobile device based upon the plurality of actual reference feeds and the plurality of virtual reference feeds.

15. The central processing station according to claim 14, wherein the central processor is further configured to:
identify the first plurality of tracking stations as being tracking stations that provide useable reference feeds from among the plurality of reference feeds, and
identify the second plurality of tracking stations as being tracking stations that provide unusable reference feeds from among the plurality of reference feeds.

16. The central processing station according to claim 14, wherein the memory is further configured to store a second algorithm to process the plurality of actual reference feeds, and
wherein the central processor is further configured to:
execute the second algorithm to process the plurality of actual reference feeds, and
derive the plurality of virtual reference feeds based on the plurality of processed actual reference feeds, satellite position information, or location information of a corresponding tracking station.

17. The central processing station according to claim 14, wherein the central processor is further configured to utilize the plurality of actual reference feeds and the plurality of virtual reference feeds to generate the assistance data.

18. The central processing station according to claim 14, wherein the central processor is further configured to:
determine a particular format to represent the assistance data based on access technology of the mobile device; and
reformat the assistance data into the determined particular format.

19. The central processing station according to claim 14, wherein the central processor is further configured to combine the plurality of actual reference feeds and the plurality of virtual reference feeds to provide a set of reference feeds.

20. The central processing station according to claim 14, wherein the plurality of actual reference feeds correspond to a location of a satellite as observed from the first plurality of tracking stations, and wherein the plurality of virtual reference feeds correspond to the location of the satellite as observed from the second plurality of tracking stations.

* * * * *